Dec. 3, 1929.  G. J. HULBERT  1,738,145
ARBOR
Filed June 18, 1924  3 Sheets-Sheet 1
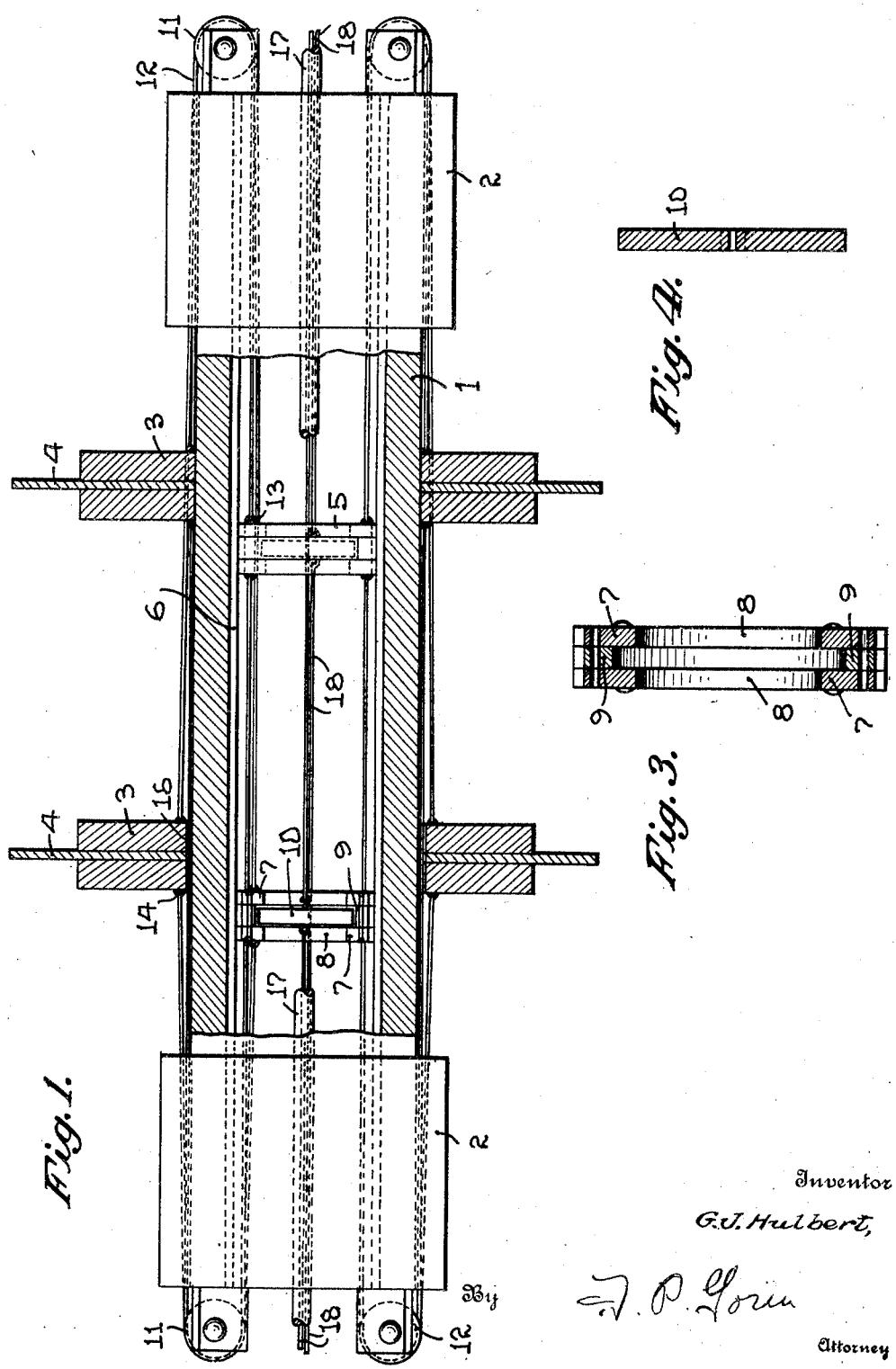
Inventor
G. J. Hulbert, Dec. 3, 1929.    G. J. HULBERT    1,738,145
ARBOR
Filed June 18, 1924    3 Sheets-Sheet 2

Inventor
G. J. Hulbert
By F. P. Sorin
Attorney

Dec. 3, 1929.    G. J. HULBERT    1,738,145
ARBOR
Filed June 18, 1924    3 Sheets-Sheet 3

INVENTOR
George J. Hulbert

Patented Dec. 3, 1929

1,738,145

UNITED STATES PATENT OFFICE

GEORGE J. HULBERT, OF SEATTLE, WASHINGTON

ARBOR

Application filed June 18, 1924. Serial No. 720,856.

This invention relates to an improvement in arbors or mandrels, and more particularly to such parts as are designed for use in connection with lumber edging machines.

In cutting shingles or the like, it frequently happens that in order to get a clear shingle, the saws must be operated to cut a section on opposite sides of an imperfection, such as a knot, and this requires a quick shifting of the desired saws upon the arbor to maintain the line of cut at the desired point.

In my Patent No. 1,390,958, I have shown means for shifting saws upon the arbor, such construction however having proven, under some circumstances, to be mechanically objectionable as there was a tendency of the saws to cant, cramp or wedge upon the arbor, due to the lack of balancing means.

The present invention is designed particularly to overcome this objection, among others, and the present construction contemplates a manually controlled connection, in the operation of which, the saws, or any one of them, may be shifted at will, while maintaining a balanced operation, thereby insuring an easy sliding movement of the saws, without liability of wedging on the arbor during such movement.

The invention is illustrated in the accompanying drawings, in which:

Fig. 1 is a view in elevation partly in section of the arbor, saws, and operating means.

Fig. 3 is a vertical section of the slide.

Fig. 4 is a vertical section of the connecting plate operative within the slide.

Figure 5:
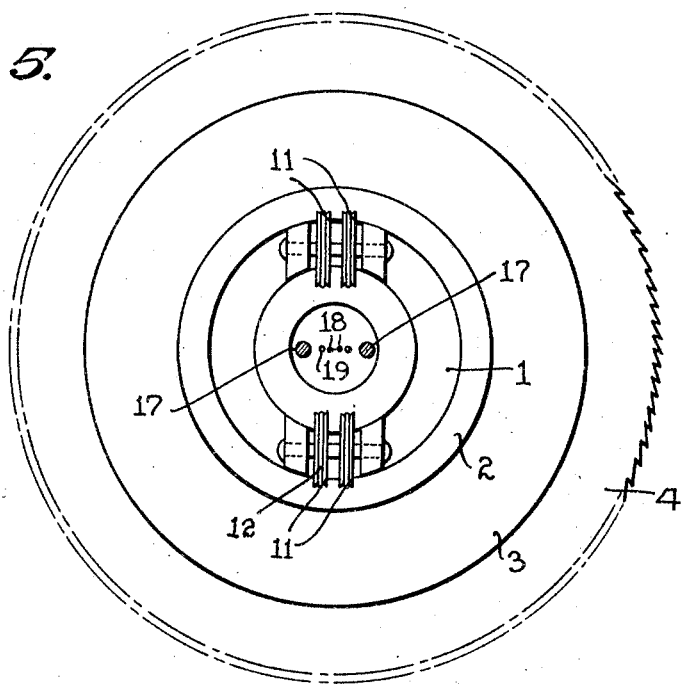
Fig. 5 is an end view of the arbor and connected parts.
Figure 2:
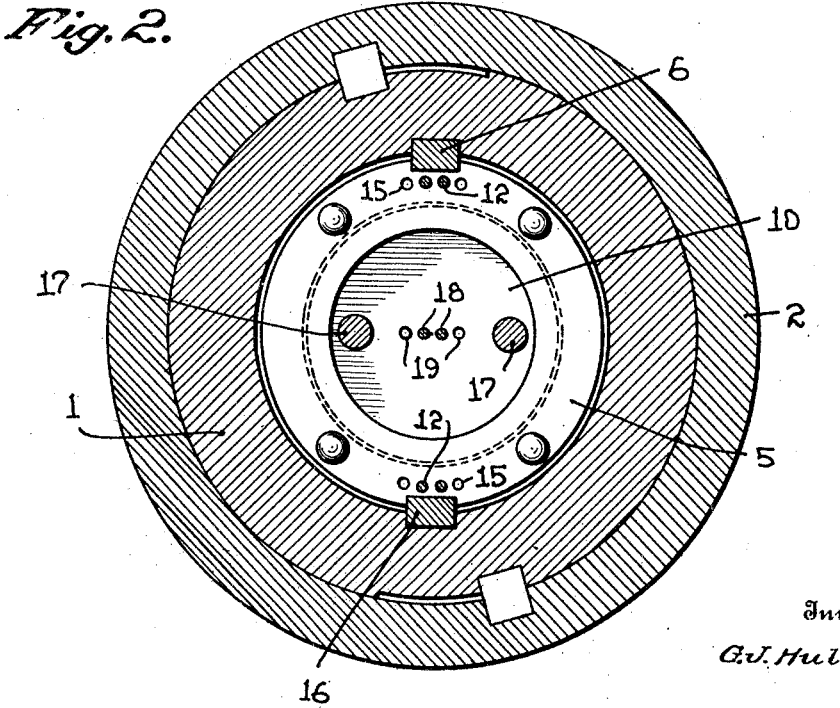
Fig. 2 is an enlarged transverse section of the same.

In the drawings, the arbor 1, of tubular form, carries end bushings 2, rotatively mounted in suitable bearings in the frame of the edger or like machine. Collars 3 are keyed upon the arbor for sliding movement and these collars receive and fixedly support the usual saws 4. Circular slides 5 are arranged for sliding cooperation with the interior of the arbor, being held against other than sliding movement by keys 6. These slides are made up of annular members 7 having comparatively large central openings 8 and held in spaced relation by annular sections 9 with the interior diameter of the latter greater than the maximum diameter of the openings 8. The slides are thus interiorly recessed, as clearly shown in Fig. 3, and the particular formation of the slides, other than to provide the construction described, is of little importance so far as the particular invention is concerned, and these slides may be obviously made up in many ways.

A connecting plate 10, of circular form, is adapted to loosely seat in the recess provided in the slides, this plate being held against frictional engagement with the slide but yet incapable of separation from the slide. At diametrically opposite points, the ends of the arbor are provided with pulleys 11, and cables 12 extend over these pulleys at one end, being terminally connected to a particular slide at 13 and to a particular saw collar 3 at 14 at diametrically opposite points of each slide and each saw carrying collar. As each saw carrying collar is thus connected to its particular slide, it will be apparent that with the movement of the slide, the saw collar will be correspondingly moved and by reason of the particular diametric connection of the cables 12, on opposite sides of the slide and saw carrying collars, any movement of the saw carrying collars is balanced, in that an equal pull is provided thereon at diametrically opposed points. The cables for connecting the slides and saw carrying collars will of course pass through all other collars and slides than the ones to which they are directly connected, the slides being formed with a series of openings 15 and the saw carrying collars with openings 16 to permit this free passage of the cables.

The connecting plates 10 are held against rotation with the arbor and slides by rods 17, which pass through the plates and are terminally secured to the frame of the edger. Each connecting plate is secured to the respective terminals of oppositely projecting cables or chains 18, and these chains are extended to the front edge of the machine to a position convenient to the operator and are secured to an operating lever, such for example, as described in my former Patent No. 1,390,958. The operating chains, other than those connected to the particular connecting plate 10, pass through openings 19 in the remaining connecting plates to permit independent adjustment of the slides.

Figure 6:
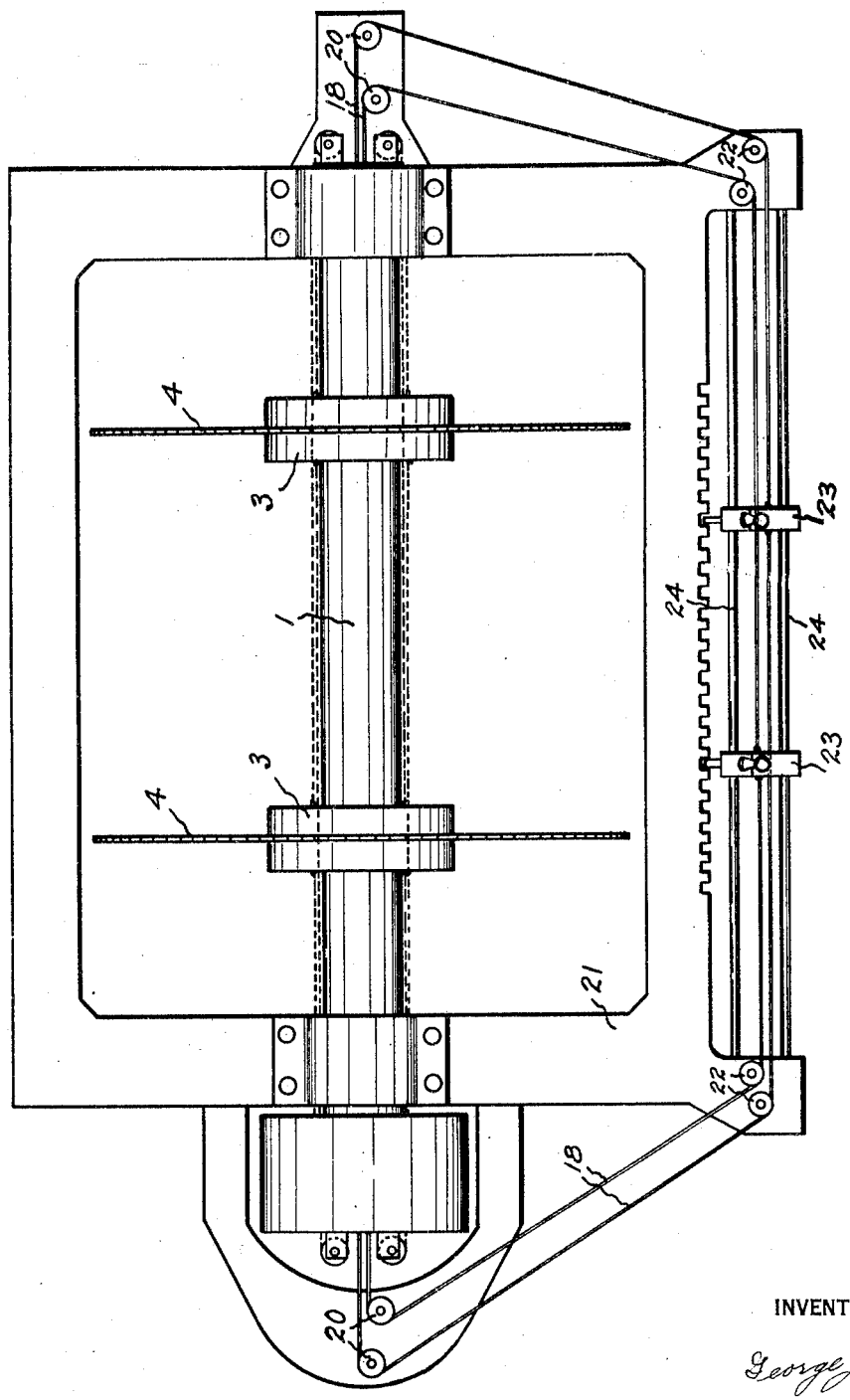
Fig. 6 is a plan view of my device.

The inside cables 18 pass out at the ends of the arbor and thence may pass over shives 20, Fig. 6, that are mounted on the ends of the frame 21 of the machine, thence toward the front of the machine and over other shives 22 and thence along the front of the machine and be secured to handles 23 that are movable lengthwise of the machine as on guide rods 24 to adjust the positions of the saws. It is desirable that the cables that are connected with the saws be arranged in balanced relation so as to exert an evenly balanced pull on the saws to avoid canting of the saws and consequent binding on the arbor. This may be done by connecting said cables at equally spaced points, as where there are two saw adjusting cables connected with each side of each saw said cables may be connected at diametrically opposite points. It is apparent that the operating cables that extend to the remote control will extend out of the ends of the arbor because they do not rotate therewith but that the adjusting cables that extend to the saws may pass from inside to outside of the arbor at any point outside of or beyond the limits of movement of the saws on the arbor.

In use, when a saw is to be shifted, the operator, through manipulation of the lever and thereby the chain connected to the connecting plate of the particular slide, operates that slide in the desired direction and through the medium of the cables 12, correspondingly moves the saw.

While the improved arbor is shown as for particular use with edging machines, it is to be understood that it is well adapted for other purposes, and such are contemplated as within the spirit of the present invention.

Claims:

1. The combination of a rotary shaft and a laterally adjustable saw or saws mounted thereon, of means for adjusting the saws by a device operating parallel to and adjacent the axis of the shaft, and involving connections from said device to the saws at points more remote from said axis and outside of the shaft which are guided to move parallel with the shaft and extend from inside to outside of the shaft without intersecting that portion of the shaft along which the saw is to be adjusted.

2. A device such as is covered by claim 1, in which the connections are flexible members guided from the inside of the shaft to the outside of the shaft around the ends of the shaft.

3. A device such as is covered by claim 1, in which the connection includes a slide or slides inside of the shaft and a plate revolvably related to each slide and to which the adjusting device is connected.

4. A device such as is covered by claim 1, in which the connecting devices include a slide or slides within the shaft, a disc revolubly related to each of said slides to which the adjusting device is connected, and guide rods upon which said disc may slide.

5. In combination a rotatably mounted tubular arbor, one or more disc like members adjustable lengthwise along said arbor, that portion of the walls of said arbor within the limits of adjustment of said members being solid and non-perforated, and means operable from within said arbor and connected with said members outside of said arbor for adjusting said members.

6. In combination a rotatably mounted tubular arbor, a disc like member mounted for longitudinal movement on said arbor and means connected with said member and operable from within said arbor and extending from interior to exterior thereof outside the limits of longitudinal movement of said member for adjusting said member.

7. In combination a rotatable tubular arbor, one or more disc like members mounted on the exterior of said arbor for rotation therewith and adjustment lengthwise thereon and means operable from within said arbor and extending from interior to exterior of said arbor beyond the limits of movement of said members and connected with said members on the exterior of said arbor at balanced points to adjust said members along said arbor without tending to cant said members.

8. In combination, a rotatably mounted tubular arbor, one or more disc like members mounted for longitudinal movement on said arbor, adjusting means connected with said members and operable from within said arbor and extending from interior to exterior thereof outside of the limits of longitudinal movement of said members and devices controlled from a remote point and extending into the end of said arbor for operating said adjusting means.

In testimony whereof I affix my signature.

GEORGE J. HULBERT.